US008682564B2

(12) United States Patent
Gauthier et al.

(10) Patent No.: US 8,682,564 B2
(45) Date of Patent: Mar. 25, 2014

(54) CAMSHAFT POSITION SENSING IN ENGINES WITH ELECTRIC VARIABLE CAM PHASERS

(75) Inventors: Daniel G. Gauthier, Clarkston, MI (US); Sebastien Stoltz-Douchet, Basse-Ham (FR); Jeffrey M Pfeiffer, Frankenmuth, MI (US)

(73) Assignee: Delphi Technologies, Inc., Troy, MI (US)

( * ) Notice: Subject to any disclaimer, the term of this patent is extended or adjusted under 35 U.S.C. 154(b) by 275 days.

(21) Appl. No.: 13/215,547

(22) Filed: Aug. 23, 2011

(65) Prior Publication Data

US 2012/0053817 A1   Mar. 1, 2012

Related U.S. Application Data

(60) Provisional application No. 61/378,048, filed on Aug. 30, 2010.

(51) Int. Cl.
 *F01L 9/04*   (2006.01)
(52) U.S. Cl.
 USPC ........ 701/102; 701/112; 701/113; 123/90.11; 123/90.15
(58) Field of Classification Search
 USPC ................... 123/90.15, 90.11; 701/102–103, 701/112–113
 See application file for complete search history.

(56) References Cited

U.S. PATENT DOCUMENTS

| | | | |
|---|---|---|---|
| 5,417,186 A | 5/1995 | Elrod et al. | |
| 6,257,186 B1 | 7/2001 | Heer | |
| 6,302,073 B1 * | 10/2001 | Heer | 123/90.17 |
| 6,328,006 B1 | 12/2001 | Heer | |
| 6,778,899 B2 * | 8/2004 | Weimer et al. | 701/115 |
| 7,201,124 B2 * | 4/2007 | Neubauer et al. | 123/90.17 |
| 7,243,627 B2 | 7/2007 | Izumi et al. | |
| 7,421,990 B2 | 9/2008 | Taye et al. | |
| 7,444,969 B2 * | 11/2008 | Inoue et al. | 123/90.17 |
| 7,541,803 B2 * | 6/2009 | Schafer et al. | 324/207.25 |
| 7,562,645 B2 * | 7/2009 | Lichti et al. | 123/90.17 |
| 7,588,013 B2 * | 9/2009 | Ichimoto | 123/347 |
| 7,640,907 B2 | 1/2010 | Nakamura | |
| 7,739,988 B2 * | 6/2010 | Mashiki et al. | 123/90.17 |
| 7,909,008 B2 * | 3/2011 | Inoue et al. | 123/90.17 |
| 7,938,088 B2 * | 5/2011 | Mashiki et al. | 123/90.15 |
| 8,020,527 B2 * | 9/2011 | Mashiki et al. | 123/90.15 |
| 8,303,450 B2 * | 11/2012 | McKinnon | 475/168 |
| 2007/0281824 A1 * | 12/2007 | Tezuka et al. | 475/331 |

(Continued)

OTHER PUBLICATIONS

U.S. Appl. No. 12/965,057.
U.S. Appl. No. 12/825,806.
U.S. Appl. No. 12/844,918.

(Continued)

*Primary Examiner* — Hai Huynh
(74) *Attorney, Agent, or Firm* — Thomas N. Twomey

(57) ABSTRACT

A method is provided for sensing the position of a camshaft in an internal combustion engine having a camshaft phaser for controllably varying the phase relationship between a crankshaft of the internal combustion engine and the camshaft, the camshaft phaser being actuated by an electric motor and having a gear reduction mechanism with a predetermined gear reduction ratio and a sensor for determining the rotational position of the electric motor. The method includes generating a rotational position signal indicative of the rotational position of the electric motor by using the sensor to determine the rotational position of the electric motor and calculating the position of the camshaft based on the rotational position signal and the gear reduction ratio of the gear reduction mechanism.

7 Claims, 8 Drawing Sheets

(56) References Cited

U.S. PATENT DOCUMENTS

| | | |
|---|---|---|
| 2011/0030631 A1 | 2/2011 | David et al. |
| 2011/0030632 A1 | 2/2011 | David et al. |
| 2011/0207578 A1* | 8/2011 | Lee et al. .................. 477/34 |
| 2012/0174883 A1* | 7/2012 | Kokubo et al. ............ 123/90.15 |

OTHER PUBLICATIONS

U.S. Appl. No. 13/112,199.
U.S. Appl. No. 13/102,138
U.S. Appl. No. 13/155,685.
U.S. Appl. No. 13/184,975.

* cited by examiner

CAMSHAFT POSITION SENSING IN ENGINES WITH ELECTRIC VARIABLE CAM PHASERS

CROSS-REFERENCE TO RELATED APPLICATIONS

This patent application claims the benefit of U.S. provisional patent application Ser. No. 61/378,048 filed Aug. 30, 2010, the disclosure of which is hereby incorporated by reference in its entirety.

TECHNICAL FIELD OF INVENTION

The present invention relates to sensing the position of a camshaft in an internal combustion engine, and more particularly to sensing the position of a camshaft in an internal combustion engine which includes an electric variable cam phaser (eVCP).

BACKGROUND OF INVENTION

Camshaft phasers ("cam phasers") for varying the timing of combustion valves in internal combustion engines are well known. A first element, known generally as a sprocket element, is driven by a chain, belt, or gearing from an engine's crankshaft. A second element, known generally as a camshaft plate, is mounted to the end of an engine's camshaft. A common type of camshaft phaser used by motor vehicle manufactures is known as a vane-type cam phaser. U.S. Pat. No. 7,421,989 shows a typical vane-type cam phaser which generally comprises a plurality of outwardly-extending vanes on a rotor interspersed with a plurality of inwardly-extending lobes on a stator, forming alternating advance and retard chambers between the vanes and lobes. Engine oil is supplied via a multiport oil control valve, in accordance with an engine control module, to either the advance or retard chambers, to change the angular position of the rotor relative to the stator, as required to meet current or anticipated engine operating conditions.

Knowing the rotational position of the camshaft can be useful, for example, for combustion control and diagnostic functions. In vane-type cam phasers, camshaft position sensing is typically accomplished by using a target wheel rotating with the camshaft which induces a signal on one or more sensors positioned next to the target wheel. The target wheel is disk shaped, and the edge thereof is varied along its periphery in some fashion, for example, by cutting a series of slots along the periphery of the wheel in a predetermined pattern. At least one sensor is used to detect the slots as they pass by the sensor. This type of camshaft rotational position sensing may require one complete revolution in order to synchronize. In other words, it may require one complete revolution in order to sense the pattern of slots to establish the position of the camshaft. Knowing the rotational position of the camshaft more quickly when the internal combustion engine is started or stopped may be desirable.

While vane-type cam phasers are effective and relatively inexpensive, they do suffer from drawbacks. First, at low engine speeds, oil pressure tends to be low, and sometimes unacceptable. Therefore, the response of a vane-type cam phaser may be slow at low engine speeds. Second, at low environmental temperatures, and especially at engine start-up, engine oil displays a relatively high viscosity and is more difficult to pump, therefore making it more difficult to quickly supply engine oil to the vane-type cam phaser. Third, using engine oil to drive the vane-type cam phaser is parasitic on the engine oil system and can lead to requirement of a larger oil pump. Fourth, for fast actuation, a larger engine oil pump may be necessary, resulting in additional fuel consumption by the engine. Lastly, the total amount of phase authority provided by vane-type cam phasers is limited by the amount of space between adjacent vanes and lobes. A greater amount of phase authority may be desired than is capable of being provided between adjacent vanes and lobes. For at least these reasons, the automotive industry is developing electrically driven cam phasers.

One type of electrically driven cam phaser being developed is shown in U.S. patent application Ser. No. 12/536,575; U.S. patent application Ser. No. 12/844,918; U.S. patent application Ser. No. 12/825,806; U.S. patent application Ser. No. 12/848,599; U.S. patent application Ser. No. 12/965,057; U.S. patent application Ser. No. 13/102,138; U.S. patent application Ser. No. 13/112,199; U.S. patent application Ser. No. 13/155,685; and U.S. patent application Ser. No. 13/184,975; which are commonly owned by Applicant and incorporated herein by reference in their entirety. The electrically driven cam phaser is an electric variable cam phaser (eVCP) which comprises a flat harmonic drive unit having a circular spline and a dynamic spline linked by a common flexspline within the circular and dynamic splines, and a single wave generator disposed within the flexspline. The circular spline is connectable to either of an engine camshaft or an engine crankshaft driven rotationally and fixed to a housing, the dynamic spline being connectable to the other thereof. The wave generator is driven selectively by an electric motor to cause the dynamic spline to rotate past the circular spline, thereby changing the phase relationship between the crankshaft and the camshaft. The electric motor may be a brushless DC motor. Brushless DC motors have three or more separate coils and replace the commutator and brushes, which are present in conventional electric motors, with an electronic circuit. Typically, three Hall Effect sensors are used to detect the position of a rotor of the motor. The circuit alternately switches the power on and off in the coils based on input from the Hall Effect sensor inputs, in turn creating forces in each coil that make the motor spin. The Hall Effect sensors are capable of detecting rotor position reliably even at zero RPM as long as the engine controller is still powered.

What is needed is a way to determine the rotational position of a camshaft in an internal combustion engine equipped with an eVCP without the need for additional components. What is also needed is a way to determine the rotational position of a camshaft in an internal combustion equipped with an eVCP even at zero RPM.

SUMMARY OF THE INVENTION

Briefly described, a method is provided for sensing the position of a camshaft in an internal combustion engine having a camshaft phaser for controllably varying the phase relationship between a crankshaft of the internal combustion engine and the camshaft where the camshaft phaser is actuated by an electric motor and includes a gear reduction mechanism with a predetermined gear reduction ratio and rotational position means for determining the rotational position of the electric motor. The method includes generating a rotational position signal indicative of the rotational position of the electric motor by using the rotational position means to determine the rotational position of the electric motor. The method also includes calculating the position of the camshaft based on the rotational position signal and the gear reduction ratio of the gear reduction mechanism.

BRIEF DESCRIPTION OF DRAWINGS

This invention will be further described with reference to the accompanying drawings in which.

DETAILED DESCRIPTION OF INVENTION

Figure 1:
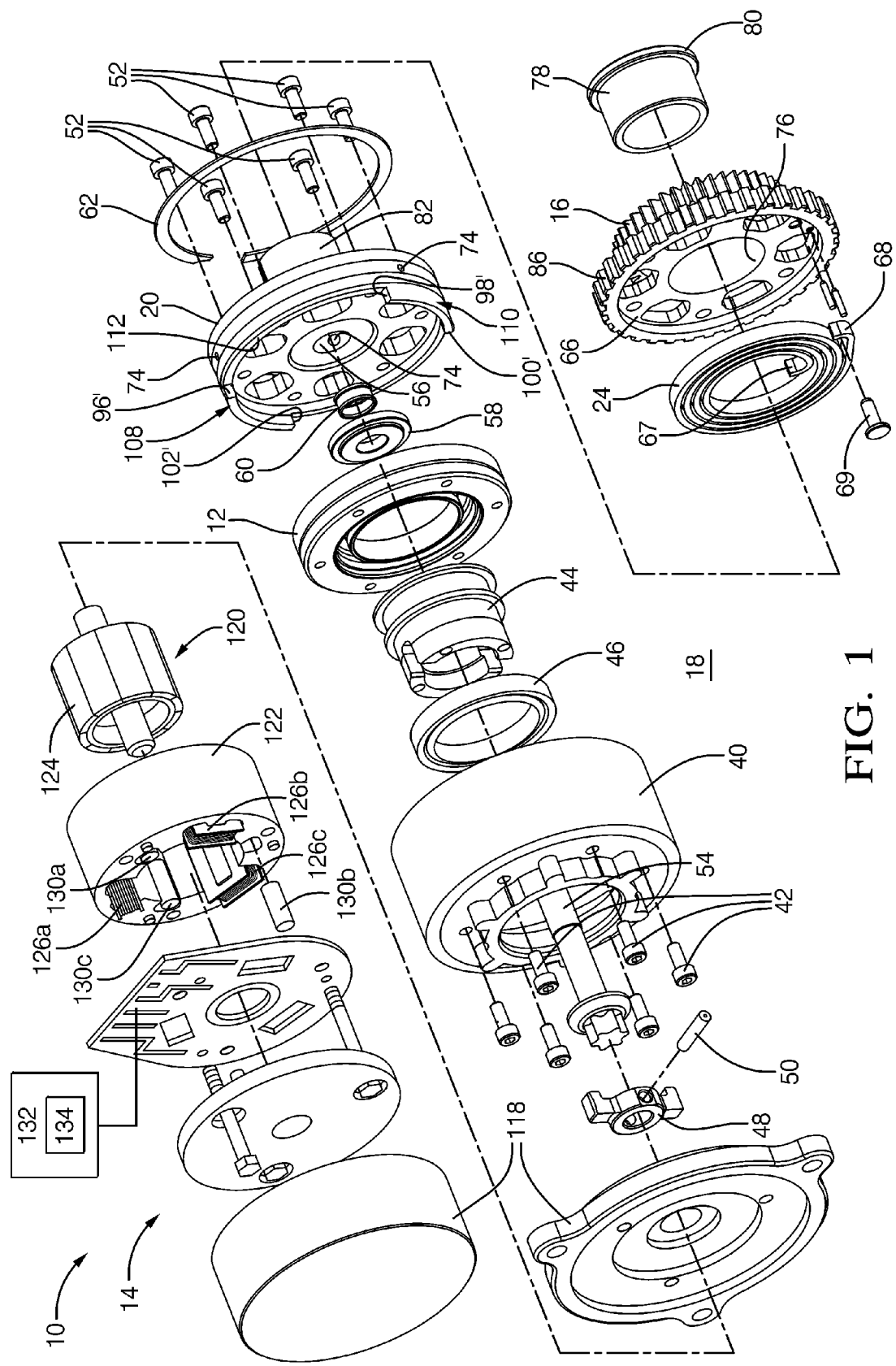
FIG. 1 is an exploded isometric view of an eVCP in accordance with the present invention.
Figure 2:
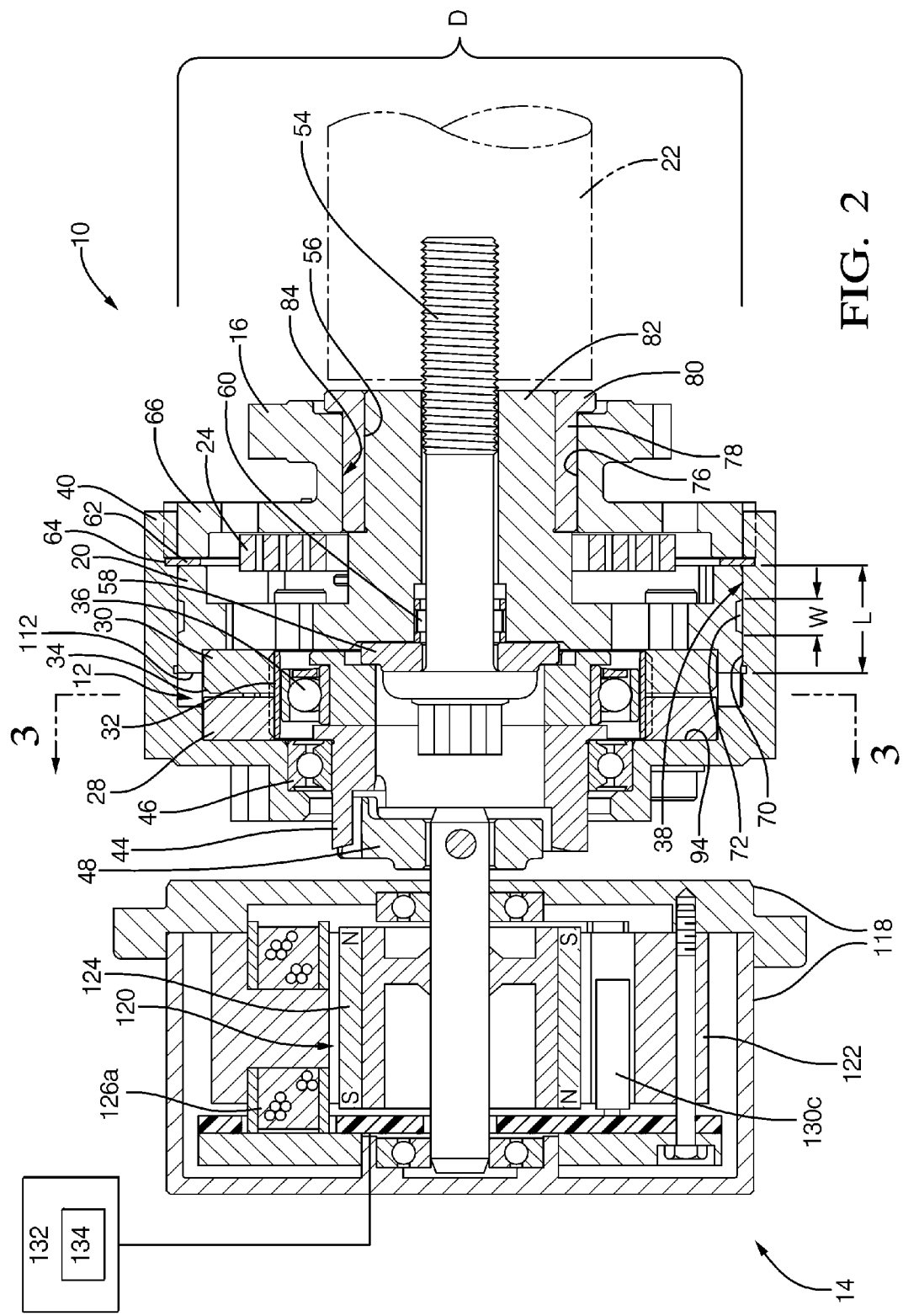
FIG. 2 is an axial cross-section of an eVCP in accordance with the present invention.

Referring to FIGS. 1 and 2, an eVCP 10 in accordance with the present invention comprises a flat harmonic gear drive unit 12; a rotational actuator 14 that is preferably a DC electric motor, operationally connected to harmonic gear drive unit 12; an input sprocket 16 operationally connected to harmonic gear drive unit 12 and drivable by a crankshaft (not shown) of engine 18; an output hub 20 attached to harmonic gear drive unit 12 and mountable to an end of an engine camshaft 22; and a bias spring 24 operationally disposed between output hub 20 and input sprocket 16. Electric motor 14 may be a brushless three-phase radial-flux DC motor.

Harmonic gear drive unit 12 comprises an outer first spline 28 which may be either a circular spline or a dynamic spline as described below; an outer second spline 30 which is the opposite (dynamic or circular) of first spline 28 and is coaxially positioned adjacent first spline 28; a flexspline 32 disposed radially inwards of both first and second splines 28, 30 and having outwardly-extending gear teeth disposed for engaging inwardly-extending gear teeth on both first and second splines 28, 30; and a wave generator 36 disposed radially inwards of and engaging flexspline 32.

Flexspline 32 is a non-rigid ring with external teeth on a slightly smaller pitch diameter than the circular spline. It is fitted over and elastically deflected by wave generator 36.

The circular spline is a rigid ring with internal teeth engaging the teeth of flexspline 32 across the major axis of wave generator 36. The circular spline serves as the input member.

The dynamic spline is a rigid ring having internal teeth of the same number as flexspline 32. It rotates together with flexspline 32 and serves as the output member. Either the dynamic spline 28 or the circular spline 30 may be identified by a chamfered corner 34 at its outside diameter to distinguish one spline from the other.

As is disclosed in the prior art, wave generator 36 is an assembly of an elliptical steel disc (not shown) supporting an elliptical bearing (not shown), the combination defining a wave generator plug. A flexible bearing retainer (not shown) surrounds the elliptical bearing and engages flexspline 32. Rotation of the wave generator plug causes a rotational wave to be generated in flexspline 32 (actually two waves 180° apart, corresponding to opposite ends of the major ellipse axis of the disc).

During assembly of harmonic gear drive unit 12, flexspline teeth engage both circular spline teeth and dynamic spline teeth along and near the major elliptical axis of the wave generator 36. The dynamic spline 28 has the same number of teeth as the flexspline 32, so rotation of the wave generator 36 causes no net rotation per revolution therebetween. However, the circular spline 30 has slightly fewer gear teeth than does the dynamic spline 28, and therefore the circular spline 30 rotates past the dynamic spline 28 during rotation of the wave generator plug, defining a gear ratio therebetween (for example, a gear ratio of 50:1 would mean that 1 rotation of the circular spline past the dynamic spline corresponds to 50 rotations of the wave generator). Harmonic gear drive unit 12 is thus a high-ratio gear transmission; that is, the angular phase relationship between first spline 28 and second spline 30 changes by 2% for every revolution of wave generator 36.

Of course, as will be obvious to those skilled in the art, the circular spline 30 may instead have slightly more teeth than the dynamic spline 28 has, in which case the rotational relationships described below are reversed.

Still referring to FIGS. 1 and 2, input sprocket 16 is fixed to a generally cup-shaped sprocket housing 40 that is fastened by bolts 42 to first spline 28 in order to prevent relative rotation therebetween. Coupling adaptor 44 is mounted to wave generator 36 and extends through sprocket housing 40, being supported by bearing 46 mounted in sprocket housing 40. Coupling adapter 44 may be made of two separate pieces that are joined together as shown in FIG. 2. Coupling 48, mounted to the motor shaft of electric motor 14 and pinned thereto by pin 50, engages coupling adaptor 44, permitting wave generator 36 to be rotationally driven by electric motor 14, as may be desired to alter the phase relationship between first spline 28 and second spline 30.

Output hub 20 is fastened to second spline 30 by bolts 52 and may be secured to engine camshaft 22 by central through-bolt 54 extending through output hub axial bore 56 in output hub 20, and capturing stepped thrust washer 58 and filter 60 recessed in output hub 20. In an eVCP, it is necessary to limit radial run-out between the input hub and output hub. In the prior art, this has been done by providing multiple roller bearings to maintain concentricity between the input and output hubs. Referring to FIG. 2, radial run-out is limited by a single journal bearing interface 38 between sprocket housing 40 (input hub) and output hub 20, thereby reducing the overall axial length of eVCP 10 and its cost to manufacture. Output hub 20 is retained within sprocket housing 40 by snap ring 62 disposed in an annular groove 64 formed in sprocket housing 40.

Back plate 66, which is integrally formed with input sprocket 16, captures bias spring 24 against output hub 20. Inner spring tang 67 is engaged by output hub 20, and outer spring tang 68 is attached to back plate 66 by pin 69. In the event of an electric motor malfunction, bias spring 24 is biased to back-drive harmonic gear drive unit 12 without help from electric motor 14 to a rotational position of second spline 30 wherein engine 18 will start or run, which position may be at one of the extreme ends of the range of authority or intermediate of the phaser's extreme ends of its rotational range of authority. For example, the rotational range of travel to which bias spring 24 biases harmonic gear drive unit 12 may be limited to something short of the end stop position of the phaser's range of authority. Such an arrangement would be useful for engines requiring an intermediate park position for idle or restart.

The nominal diameter of output hub 20 is D; the nominal axial length of first journal bearing 70 is L; and the nominal axial length of the oil groove 72 formed in either output hub 20 (shown) and/or in sprocket housing 40 (not shown) for supplying oil to first journal bearing 70 is W. In addition to journal bearing clearance, the length L of the journal bearing in relation to output hub diameter D controls how much output hub 20 can tip within sprocket housing 40. The width of oil groove 72 in relation to journal bearing length L controls how much bearing contact area is available to carry the radial load. Experimentation has shown that a currently preferred range of the ratio L/D may be between about 0.25 and about 0.40, and that a currently preferred range of the ratio W/L may be between about 0.15 and about 0.70.

Oil provided by engine 18 is supplied to oil groove 72 by one or more oil passages 74 that extend radially from output hub axial bore 56 of output hub 20 to oil groove 72. Filter 60 filters contaminants from the incoming oil before entering oil passages 74. Filter 60 also filters contaminants from the incoming oil before being supplied to harmonic gear drive unit 12 and bearing 46. Filter 60 is a band-type filter that may be a screen or mesh and may be made from any number of different materials that are known in the art of oil filtering.

Extension portion 82 of output hub 20 receives bushing 78 in a press fit manner. In this way, output hub 20 is fixed to bushing 78. Input sprocket axial bore 76 interfaces in a sliding fit manner with bushing 78 to form second journal bearing 84. This provides support for the radial drive load placed on input sprocket 16 and prevents the radial drive load from tipping first journal bearing 70 which could cause binding and wear issues for first journal bearing 70. Bushing 78 includes radial flange 80 which serves to axially retain back plate 66/input sprocket 16. Alternatively, but not shown, bushing 78 may be eliminated and input sprocket axial bore 76 could interface in a sliding fit manner with extension portion 82 of output hub 20 to form second journal bearing 84 and thereby provide the support for the radial drive load placed on input sprocket 16. In this alternative, back plate 66/input sprocket 16 may be axially retained by a snap ring (not shown) received in a groove (not shown) of extension portion 82.

Figure 5:
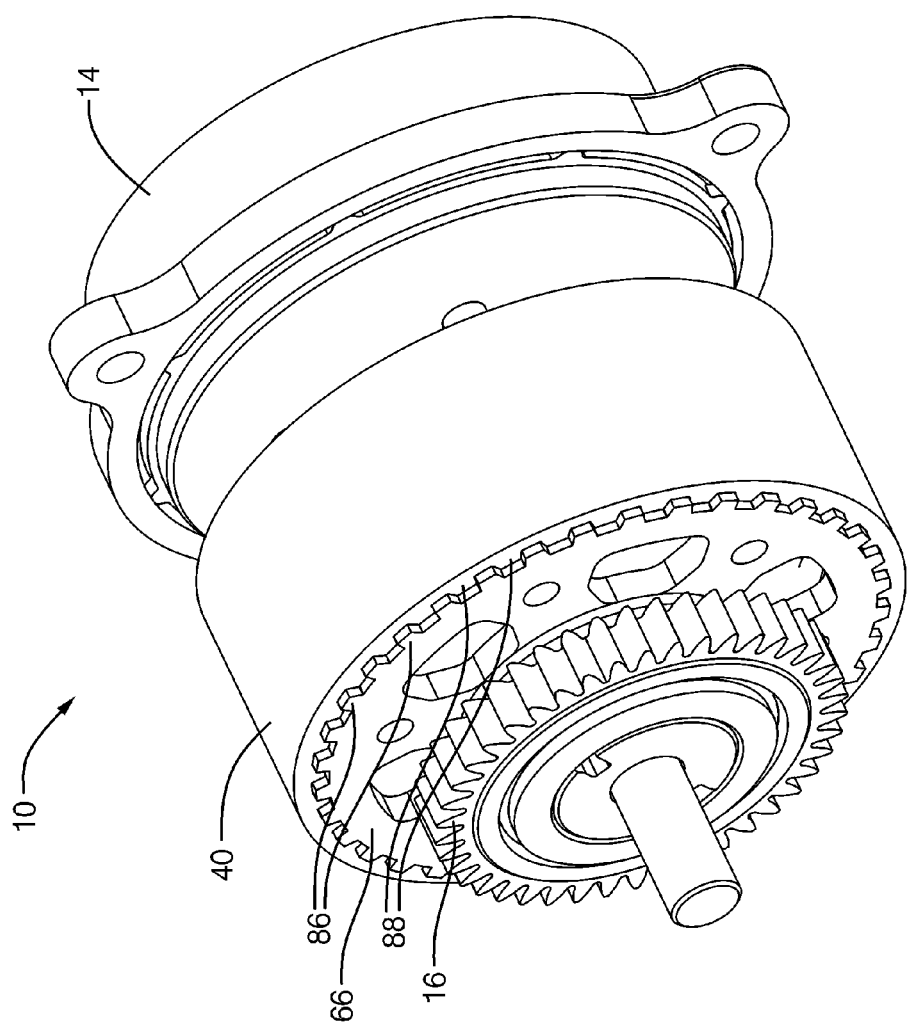
FIG. 5 is an isometric view of an eVCP in accordance with the present invention.

In order to transmit torque from input sprocket 16/back plate 66 to sprocket housing 40 and referring to FIGS. 1, 2, and 5, a sleeve gear type joint is used in which back plate 66 includes external splines 86 which slidingly fit with internal splines 88 included within sprocket housing 40. The sliding fit nature of the splines 86, 88 eliminates or significantly reduces the radial tolerance stack issue between first journal bearing 70 and second journal bearing 84 because the two journal bearings 70, 84 operate independently and do not transfer load from one to the other. If this tolerance stack issue were not resolved, manufacture of the two journal bearings would be prohibitive in mass production because of component size and concentricity tolerances that would need to be maintained. The sleeve gear arrangement also eliminates then need for a bolted flange arrangement to rotationally fix back plate 66 to sprocket housing 40 which minimizes size and mass. Additionally, splines 86, 88 lend themselves to fabrication methods where they can be net formed onto back plate 66 and into sprocket housing 40 respectively. Splines 86, 88 may be made, for example, by powder metal process or by standard gear cutting methods.

Figure 3:
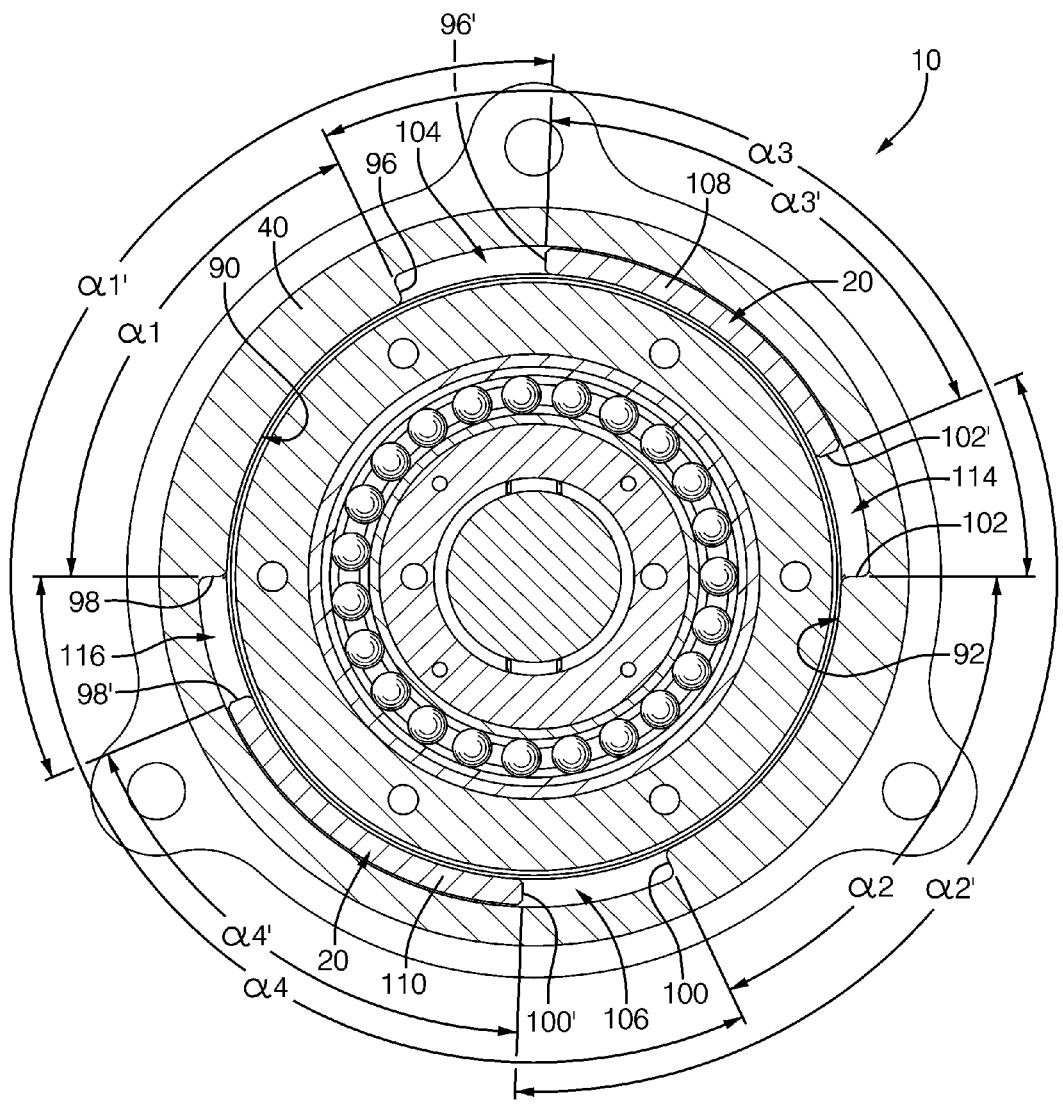
FIG. 3 is a radial cross-section through line 3-3 of FIG. 2.
Figure 4:
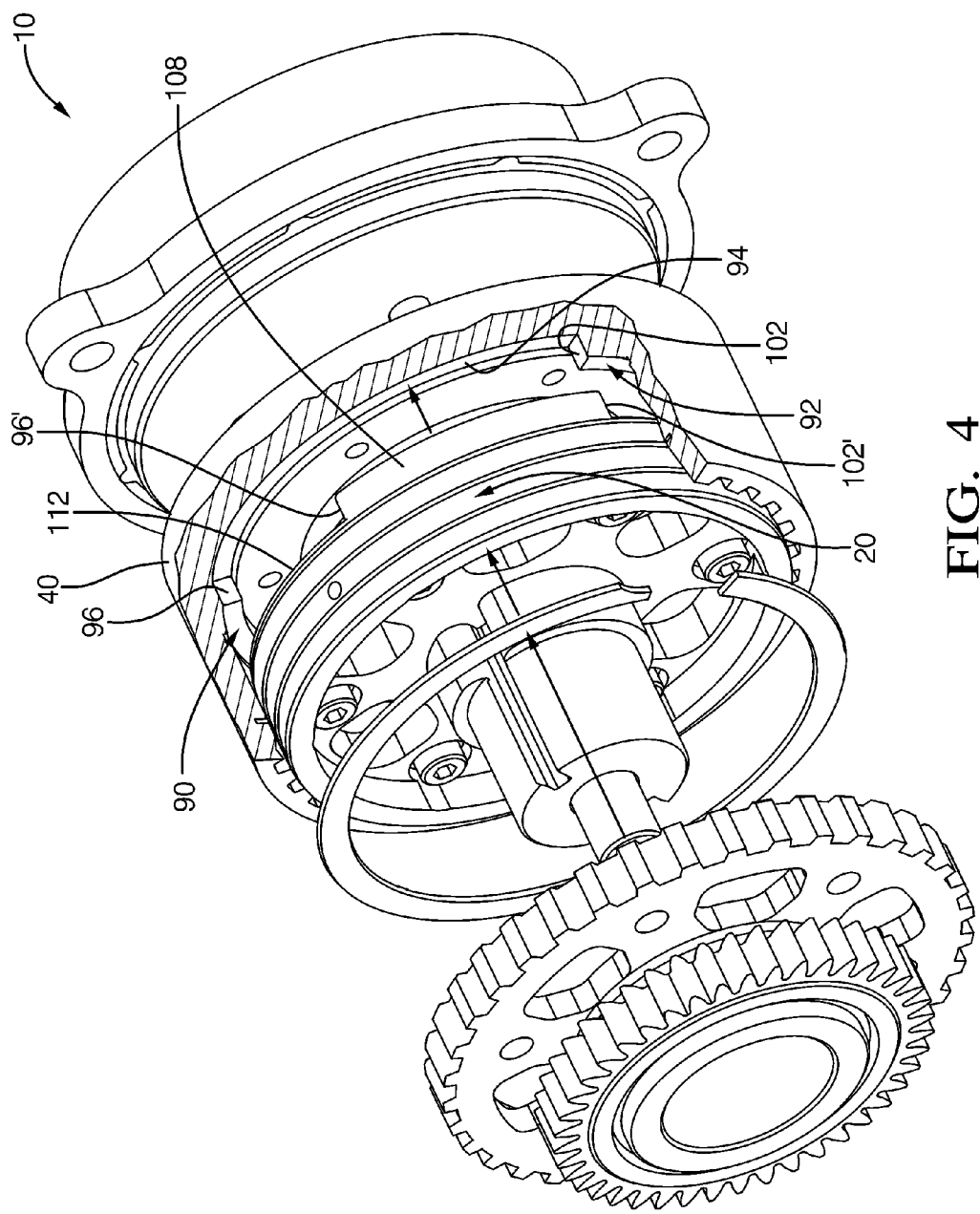
FIG. 4 is an exploded isometric partial cut-away view of an eVCP in accordance with the present invention.

Now referring to FIGS. 3 and 4, eVCP 10 is provided with a means for limiting the phase authority of eVCP 10. Sprocket housing 40 is provided with first and second arcuate input stop members 90, 92 which extend axially away from first surface 94 (also shown in FIG. 2) of sprocket housing 40, the first and second lengths of which are defined by the arcuate or angular distances $\alpha 1$, $\alpha 2$ respectively. First surface 94 is the bottom of the longitudinal bore which receives output hub 20 within sprocket housing 40. First arcuate input stop member 90 includes first advance stop surface 96 and first retard stop surface 98 which define the ends of first arcuate input stop member 90. Similarly, second arcuate input stop member 92 includes second advance stop surface 100 and second retard stop surface 102 which define the ends of second arcuate input stop member 92. First arcuate input opening 104 is defined between first advance stop surface 96 of first arcuate input stop member 90 and second retard stop surface 102 of second arcuate input stop member 92. First arcuate input opening 104 has a third length defined by the arcuate or angular distance $\alpha 3$. Similarly, second arcuate input opening 106 is defined between first retard stop surface 98 of first arcuate input stop member 90 and second advance stop surface 100 of second arcuate input stop member 92. Second arcuate input opening 106 has a fourth length defined by the arcuate or angular distance $\alpha 4$.

Now referring to FIGS. 1, 3, and 4, output hub 20 includes corresponding features which interact with first and second arcuate input stop members 90, 92 and first and second arcuate input openings 104, 106 to limit the phase authority of eVCP 10. Output hub 20 is provided with first and second arcuate output stop members 108, 110 which extend axially away from second surface 112 (also shown in FIG. 2) of output hub 20, the fifth and sixth lengths of which are defined by the arcuate or angular distances $\alpha 3'$, $\alpha 4'$ respectively. Second surface 112 is the end of output hub 20 which faces toward first surface 94. First arcuate output stop member 108 includes third advance stop surface 96' and fourth retard stop surface 102' which define the ends of first arcuate output stop member 108. Similarly, second arcuate output stop member 110 includes fourth advance stop surface 100' and third retard stop surface 98' which define the ends of second arcuate output stop member 110. First arcuate output opening 114 is defined between fourth retard stop surface 102' of first arcuate output stop member 108 and fourth advance stop surface 100' of second arcuate output stop member 110. First arcuate output opening 114 has a seventh length defined by the arcuate or angular distance $\alpha 2'$. Similarly, second arcuate output opening 116 is defined between third retard stop surface 98' of second arcuate output stop member 110 and third advance stop surface 96' of first arcuate output stop member 108. Second arcuate output opening 116 has an eighth length defined by the arcuate or angular distance $\alpha 1'$.

In order to establish the phase authority of eVCP 10, first and second arcuate input stop members 90, 92 are axially and radially received within second and first arcuate output openings 116, 114 respectively. Similarly, first and second arcuate output stop members 108, 110 are axially and radially received within first and second arcuate input openings 104, 106 respectively. The arcuate stop members and each corresponding arcuate opening within which the arcuate stop member is received are sized such that the angular distance of each angular opening minus the angular distance of the corresponding arcuate stop member is equal to the phase authority of eVCP 10. For example, angular distance $\alpha 1'$ minus angular distance $\alpha$ equals the phase authority of eVCP 10. Stated another way, if the phase authority for eVCP 10 is 50 degrees, then angular distance $\alpha 1'$ (in degrees) minus angular distance $\alpha 1$ (in degrees) equals 50 degrees.

Angular distances $\alpha 1$, $\alpha 2$ of first and second arcuate input stop members 90, 92 are preferably equal and first and second arcuate input stop members 90, 92 are preferably angularly spaced in a symmetric manner. Similarly, angular distance $\alpha 3'$, $\alpha 4'$ of first and second arcuate output stop members 108, 110 are preferably equal and first and second arcuate output stop members 108, 110 are preferably angularly spaced in a symmetric manner. As can now be seen, distinct eVCPs can be provided for different engine application requiring different amounts of phase authority simply by redesigning the input stop members and the output stop members to achieve the desired phase authority.

Angular distances α3, α4 of first and second arcuate input openings 104, 106 are preferably equal and first and second arcuate input openings 104, 106 are preferably angularly spaced in a symmetric manner. Similarly, angular distance α1', α2' of first and second arcuate output openings 114, 116 are preferably equal and first and second arcuate output openings 114, 116 are preferably angularly spaced in a symmetric manner.

Figure 6:
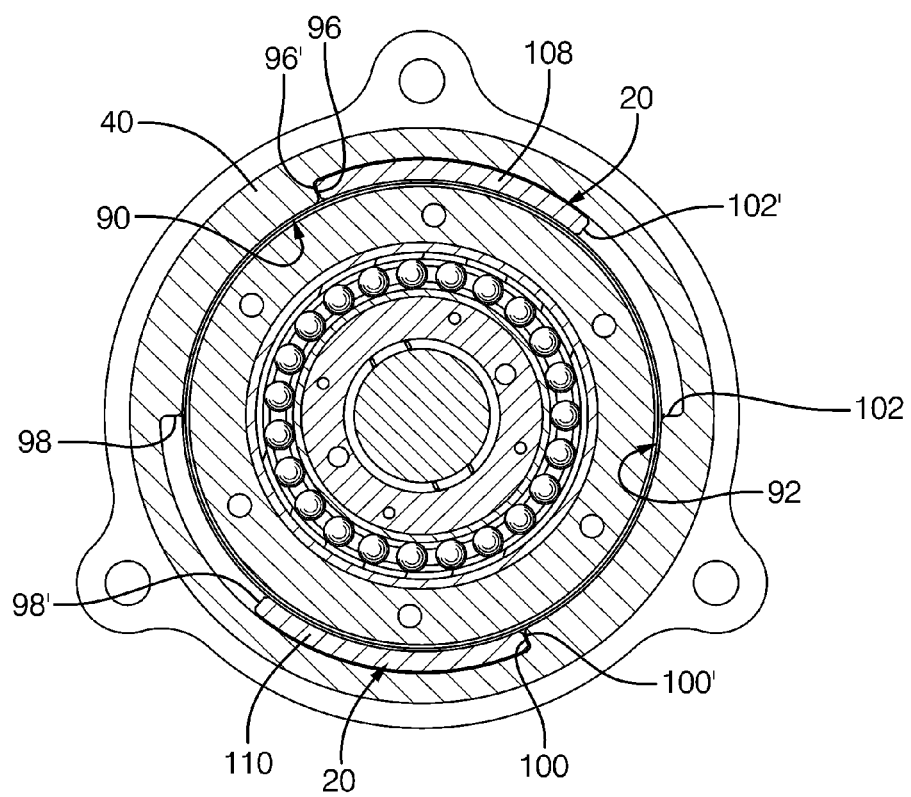
FIG. 6 is a radial cross-section as in FIG. 3 now shown in the maximum advance valve timing position.
Figure 7:
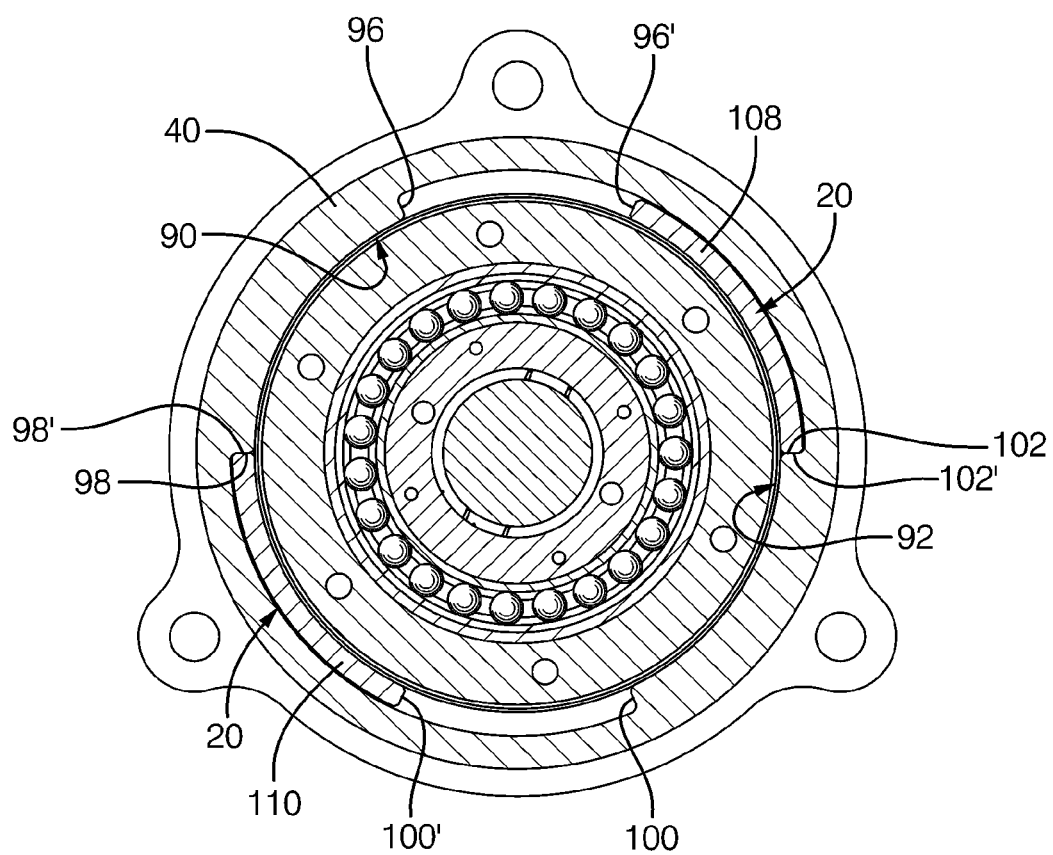
FIG. 7 is a radial cross-section as in FIG. 3, now shown in the maximum retard valve timing position.

In operation, when eVCP 10 is commanded to provide maximum valve timing advance, electric motor 14 will actuate harmonic gear drive unit 12 to rotate output hub 20 with respect to sprocket housing 40 until first and third advance stop surfaces 96, 96' are in contact with each other (FIG. 6). At the same time, second and fourth advance stop surfaces 100, 100' are in contact with each other. Similarly, when eVCP 10 is commanded to provide maximum valve timing retard, electric motor 14 will actuate harmonic gear drive unit 12 to rotate output hub 20 with respect to sprocket housing 40 until second and fourth retard surfaces 102, 102' are in contact with each other (FIG. 7). At the same time, first and third retard surfaces 98, 98' are in contact with each other.

Now referring to FIGS. 1 and 2, electric motor 14, which is preferably a three-phase brushless DC motor, includes motor housing 118 which may be bolted to engine 18 in order to prevent relative rotation therebetween. Motor housing 118 includes rotor 120 therewithin which is rotatable relative to motor housing 118. Motor housing 118 also includes stator 122 therewithin which is fixed to motor housing 118 to prevent relative rotation therebetween. Rotor 120 includes multi-pole ring magnet 124 surrounding the perimeter thereof. In this example, multi-pole ring magnet 124 includes five pole pairs where each pole is preferably equal in angular length, that is, about 36°. Stator 122 includes three electrical windings 126a, 126b, 126c; each winding establishing a phase of electric motor 14. Electrical windings 126a, 126b, 126c are preferably spaced equiangularly.

Electric motor 14 includes a rotation position means including three Hall Effect sensors 130a, 130b, 130c that are used to detect the rotational position of rotor 120. Hall Effect sensors 130a, 130b, 130c generate a rotational position signal indicative of the rotational position of rotor 120. The rotational position of rotor 120 may also be referred to as the rotational position of electric motor 14. One Hall Effect sensor is disposed between each of the three electrical windings 126a, 126b, 126c in stator 122. Hall Effect sensors 130a, 130b, 130c are preferably spaced equiangularly. Each Hall Effect sensors 130a, 130b, 130c sends the rotational position signal to engine control module (ECM) 132 which alternately switches the power on and off to electrical windings 126a, 126b, 126c of the three phases based on input from the Hall Effect sensors 130a, 130b, 130c, in turn creating forces in each electrical winding 126a, 126b, 126c that make rotor 120 rotate about its central axis. Hall Effect sensors 130a, 130b, 130c are capable of detecting the position of rotor 120 even at zero RPM as long as ECM 132 is still powered. Since rotor 120 of electric motor 14 is connected to engine camshaft 22 through harmonic gear drive unit 12, the position of rotor 120, $\theta_{actuator}$, correlates to the position of engine camshaft 22, $\theta_{camshaft}$, based on the position of the crankshaft, $\theta_{sprocket}$, according to equations A and B below. Therefore, Hall Effect sensors 130a, 130b, 130c can also be used to detect the position of engine camshaft 22 even at zero RPM as long as ECM 132 is still powered. Using Hall Effect sensors 130a, 130b, 130c to determine the position of engine camshaft 22 eliminates the need for a separate sensor for determining the position of engine camshaft 22.

$$\theta_{camshaft} - \theta_{sprocket} = \frac{\text{Phase Angle}}{2} \qquad \text{Equation A}$$

$$\theta_{camshaft} - \theta_{sprocket} = \frac{1}{\text{Gear Ratio}} \times (\theta_{sprocket} - \theta_{actuator}) \qquad \text{Equation B}$$

When engine 18 is turned off by the operator of the motor vehicle, power may continue to be supplied to ECM 132 until after engine 18 comes to a complete stop. Since power is still supplied to ECM 132 when engine 18 comes to a complete stop, Hall Effect sensors 130a, 130b, 130c can determine the rotational position of engine camshaft 22 even when engine 18 is no longer rotating. The position of engine camshaft 22 can then be stored in non-volatile random access memory 134 of ECM 132. Because eVCP 10 uses a high gear ratio harmonic drive unit, the rotational position of engine camshaft 22 will not change due to residual cam torque generated by open intake or exhaust valves pushing against engine camshaft 22. After the position of engine camshaft 22 is stored in the non-volatile random access memory 134 of ECM 132, power to ECM 132 may be discontinued. In this way, when engine 18 is commanded to be started by the operator of the motor vehicle, the rotational position of engine camshaft 22 can be immediately recalled from the ECM 132 without the need to synchronize the rotational position of engine camshaft 22 with the crankshaft of engine 18.

Diagnostics may be performed upon start up of engine 18 in order to determine if engine camshaft 22 is not in the position it should be in based on the position of engine camshaft 22 at the time engine 18 was stopped. The rotation position of engine camshaft 22 may change, for example, due to the motor vehicle being pushed or being parked on a hill. If the diagnostics indicate that engine camshaft 22 is not in the position it should be, Hall Effect sensors 130a, 130b, 130c can be used to synchronize the position of engine camshaft 22 with the crankshaft of engine 18 in a conventional manner. For example, a 58X crankshaft sensor (not shown) which produces a pulse every six degrees of crankshaft rotation with two missing pulses every 360 degrees of crankshaft rotation as an index can be used to determine the crankshaft position, $\theta_{sprocket}$. This requires a maximum of one engine rotation (one-half camshaft rotation) to reach the two missing pulses in order to obtain the absolute crankshaft position. ECM 132 commands eVCP 10 to full advance such that first and third advance stop surfaces 96, 96' are in contact with each other (FIG. 6) and second and fourth advance stop surfaces 100, 100' are in contact with each other. With the crankshaft position known and eVCP 10 fully advanced, the absolute position of engine camshaft 22 is now known. Equations A and B above may now be used to determine the phase angle based on crank position and camshaft position. This same process may be used to synchronize the position of engine camshaft 22 if ECM 132 is not equipped with non-volatile random access memory 134 and power has been shut off to ECM 132 in an engine shutdown event.

This same process may be used to determine the camshaft position.

Figure 8:
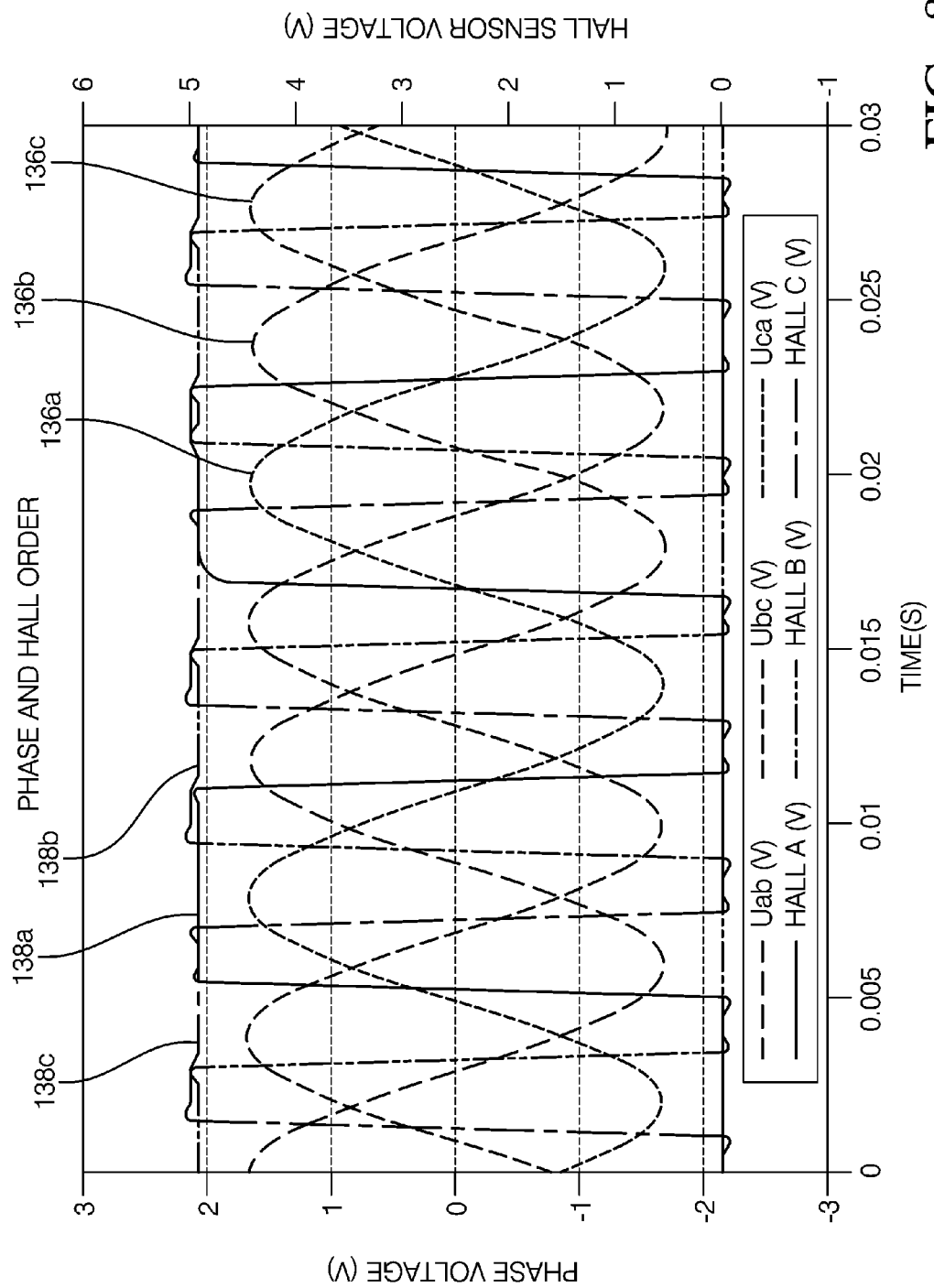
FIG. 8 is a plot showing the voltage of each Hall Effect sensor and the voltage of each phase of an electric motor used to actuate an eVCP.

FIG. 8 shows a plot of the voltage of electrical winding 126a, 126b, 126c of electric motor 14 (left ordinate axis) over time as well as the voltage of each Hall Effect sensors 130a, 130b, 130c (right ordinate axis). The voltage of electrical windings 126a, 126b, 126c are represented by traces 136a, 136b, 136c respectively while the voltage of Hall Effect sensors 130a, 130b, 130c are represented by traces 138a, 138b, 138c respectively. Each vertical section of traces 138a, 138b, 138c represents a transition from one pole to an adjacent pole of multi-pole ring magnet 124 passing a corresponding Hall Effect sensor. As can be seen, traces 136a, 136b, 136c, 138a, 138b, and 138c produce a pattern that can be used to always determine the relative actuator position.

Stopping the engine 18 may also be desirable in order to conserve fuel when the motor vehicle is not in motion and engine 18 would otherwise be idling, for example, when stopped at a stop sign or traffic light. When engine 18 is stopped under these circumstances, power continues to be supplied to the ECM 132. Therefore, eVCP 10 can be used, even when engine 18 is stopped, to position engine camshaft 22 to a rotational position that benefits restart of engine 18 when motion of the motor vehicle is commanded. Of course, eVCP 10 can also be used prior to engine 18 being stopped to position engine camshaft 22 to a rotation position that benefits restart of engine 18 when motion of the motor vehicle is commanded. One such rotational position may be what is referred to in the art as decompression mode. In decompression mode, engine camshaft 22 is phased relative to the crankshaft of engine 18 such that minimal pressure is generated in the combustion chamber of engine 18 such that minimal torque is required to overcome the pressure inside the combustion chambers as engine 18 is restarted.

In order to restart engine 18 that has been stopped for the purpose of conserving fuel when there is no motion of the motor vehicle, one proposal has been made to use fuel and spark to instantly produce driving power. In this technique, high pressure fuel is injected directly into the combustion chamber of engine 18. The high pressure charge of fuel is then ignited to create torque to restart engine 18. This technique eliminates the need for use of the conventional starter which may delay restart of engine 18. This technique is aided by stopping engine 18 in a specific optimized position. Knowing the position of engine camshaft 22 as the internal combustion engine approaches zero RPMs can aid in stopping engine 18 in the specific optimized position. In one example, using the position of engine camshaft 22 in conjunction with ECM 132 controlling throttle and spark, engine 18 can be stopped at the specific optimized position.

While stator 122 has been described as having three electrical windings, each establishing a phase, it should now be understood that each phase may include more than one winding. When the stator includes more than one winding for each phase, the windings may be arranged in an alternating pattern such that adjacent windings are of different phases.

While the embodiment described herein describes input sprocket 16 as being smaller in diameter than sprocket housing 40 and disposed axially behind sprocket housing 40, it should now be understood that the input sprocket may be radially surrounding the sprocket housing and axially aligned therewith. In this example, the back plate may be press fit into the sprocket housing rather than having a sleeve gear type joint.

While the embodiment described herein includes first and second input stop members, it should now be understood that more or fewer arcuate input stop members may be included. Similarly, more or fewer arcuate output stop members may be included.

While the embodiment described herein describes angular distances α1, α2 of first and second arcuate input stop members 90, 92 as equal and first and second arcuate input stop members 90, 92 are angularly spaced in a symmetric manner, it should now be understood that the first and second arcuate input stop members may be have unequal lengths and may also be spaced asymmetrically. This will result in the first and second arcuate output members being unequal in length and being spaced asymmetrically.

The embodiment described herein describes harmonic gear drive unit 12 as comprising outer first spline 28 which may be either a circular spline or a dynamic spline which serves as the input member; an outer second spline 30 which is the opposite (dynamic or circular) of first spline 28 and which serves as the output member and is coaxially positioned adjacent first spline 28; a flexspline 32 disposed radially inwards of both first and second splines 28, 30 and having outwardly-extending gear teeth disposed for engaging inwardly-extending gear teeth on both first and second splines 28, 30; and a wave generator 36 disposed radially inwards of and engaging flexspline 32. As described, harmonic gear drive unit 12 is a flat plate or pancake type harmonic gear drive unit as referred to in the art. However, it should now be understood that other types of harmonic gear drive units may be used in accordance with the present invention. For example, a cup type harmonic gear drive unit may be used. The cup type harmonic gear drive unit comprises a circular spline which serves as the input member; a flexspline which serves as the output member and which is disposed radially inwards of the circular spline and having outwardly-extending gear teeth disposed for engaging inwardly-extending gear teeth on the circular spline; and a wave generator disposed radially inwards of and engaging the flexspline.

While the embodiment of eVCP 10 described herein includes harmonic gear drive unit 12 driven by electric motor 14, it should be understood that harmonic gear drive unit 12 may be replaced with any number of gear drive units or gear reduction units commonly known for transmitting torque from a driving member to a driven member.

While this invention has been described in terms of preferred embodiments thereof, it is not intended to be so limited, but rather only to the extent set forth in the claims that follow.

We claim:

1. A method for sensing the position of a camshaft in an internal combustion engine having a camshaft phaser for controllably varying the phase relationship between a crankshaft of the internal combustion engine and said camshaft, said camshaft phaser being actuated by an electric motor and having a gear reduction mechanism with a predetermined gear reduction ratio and rotational position means for determining the rotational position of said electric motor, said method comprising:
    generating a rotational position signal indicative of the rotational position of said electric motor by using said rotational position means to determine the rotational position of said electric motor; and
    calculating the position of said camshaft based on said rotational position signal and the gear reduction ratio of said gear reduction mechanism.

2. A method as in claim 1 further comprising:
    turning off said internal combustion engine;
    supplying power to an engine control module of said internal combustion engine after turning off said internal combustion engine; and
    continuing to calculate the position of said camshaft based on said rotational position signal and the gear reduction ratio of said gear reduction mechanism until said internal combustion engine comes to a complete stop.

3. A method as in claim 2 further comprising storing the calculated position of said camshaft when said internal combustion engine comes to a complete stop.

4. A method as in claim 3 further comprising discontinuing power to said engine control module.

5. A method as in claim 4 further comprising:
restarting said internal combustion engine; and
recalling the stored calculated position of said camshaft.

6. A method as in claim 2 further comprising:
using said camshaft phaser to change the phase relationship between said crankshaft and said camshaft after said internal combustion engine has come to a complete stop; and
continuing to calculate the position of said camshaft based on said rotational position signal and the gear reduction ratio of said gear reduction mechanism while said internal combustion engine is off and while said camshaft phaser is used to change the phase relationship between said crankshaft and said camshaft.

7. A method as in claim 2 further comprising using the calculated position to stop said internal combustion engine at a predetermined location.

* * * * *